US012285910B2

(12) United States Patent
Chartrain et al.

(10) Patent No.: US 12,285,910 B2
(45) Date of Patent: Apr. 29, 2025

(54) HIGH-TEMPERATURE STEREOLITHOGRAPHY APPARATUS AND METHODS OF USE THEREOF

(71) Applicant: Virginia Tech Intellectual Properties, Inc., Blacksburg, VA (US)

(72) Inventors: Nicholas Chartrain, Blacksburg, VA (US); Viswanath Meenakshisundaram, Blacksburg, VA (US); Christopher B. Williams, Blacksburg, VA (US)

(73) Assignee: VIRGINIA TECH INTELLECTUAL PROPERTIES, INC., Blacksburg, VA (US)

( * ) Notice: Subject to any disclaimer, the term of this patent is extended or adjusted under 35 U.S.C. 154(b) by 710 days.

(21) Appl. No.: 16/954,124

(22) PCT Filed: Dec. 15, 2018

(86) PCT No.: PCT/US2018/065883

§ 371 (c)(1),
(2) Date: Jun. 15, 2020

(87) PCT Pub. No.: WO2019/118946

PCT Pub. Date: Jun. 20, 2019

(65) Prior Publication Data

US 2021/0162657 A1 Jun. 3, 2021

Related U.S. Application Data

(60) Provisional application No. 62/599,287, filed on Dec. 15, 2017.

(51) Int. Cl.
*B29C 64/255* (2017.01)
*B29C 64/124* (2017.01)
(Continued)

(52) U.S. Cl.
CPC .......... *B29C 64/135* (2017.08); *B29C 64/209* (2017.08); *B29C 64/245* (2017.08);
(Continued)

(58) Field of Classification Search
CPC ... B29C 64/135; B29C 64/209; B29C 64/245; B29C 64/255; B29C 64/264;
(Continued)

(56) References Cited

U.S. PATENT DOCUMENTS 5,258,146 A 11/1993 Almquist et al.
5,503,793 A * 4/1996 Uchinono ............ B29C 64/124 427/512

(Continued)

OTHER PUBLICATIONS

English Translation of DE 102016211799A1 (Year: 2018).*
International Search Report mailed Apr. 19, 2019.

*Primary Examiner* — Galen H Hauth
*Assistant Examiner* — Baileigh Kate Darnell
(74) *Attorney, Agent, or Firm* — Thomas | Horstemeyer, LLP

(57) ABSTRACT

In various aspects, top-down stereolithography apparatus and methods of use thereof are provided herein that allow for additive manufacturing of an article from a high-viscosity resin. The apparatus and methods can print resins having viscosities higher than conventional systems, e.g. viscosities up to about 100 Pa·s at the elevated temperature. The resin may have a room temperature viscosity of about 100 Pa·s, about 250 Pa·s, about 1000 Pa·s, or more. In some aspects, the resin is a solid at room temperature. The apparatus and methods do not rely upon solvents or other viscosity modifiers being added to the resin, and are capable of top-down additive manufacturing approaches which provide reduced stress on the printed article.

20 Claims, 7 Drawing Sheets

100 130 132 140 142 120 101 104 106 102 101 112 110 122 114

(51) Int. Cl.

| | |
|---|---|
| ***B29C 64/135*** | (2017.01) |
| ***B29C 64/209*** | (2017.01) |
| ***B29C 64/245*** | (2017.01) |
| ***B29C 64/264*** | (2017.01) |
| ***B29C 64/295*** | (2017.01) |
| ***B33Y 10/00*** | (2015.01) |
| ***B33Y 30/00*** | (2015.01) |
| ***B33Y 70/00*** | (2020.01) |
| ***C08F 120/68*** | (2006.01) |
| ***C08F 283/00*** | (2006.01) |
| ***C08F 283/06*** | (2006.01) |
| ***C08L 5/00*** | (2006.01) |
| *B29K 33/00* | (2006.01) |
| *B29K 75/00* | (2006.01) |
| *B29K 105/00* | (2006.01) |
| *B29L 31/52* | (2006.01) |

(52) U.S. Cl.

CPC .......... *B29C 64/255* (2017.08); *B29C 64/264* (2017.08); *B29C 64/295* (2017.08); *B33Y 10/00* (2014.12); *B33Y 30/00* (2014.12); *B33Y 70/00* (2014.12); *C08F 120/68* (2013.01); *C08F 283/006* (2013.01); *C08F 283/065* (2013.01); *C08L 5/00* (2013.01); *B29K 2005/00* (2013.01); *B29K 2033/08* (2013.01); *B29K 2075/00* (2013.01); *B29K 2105/0088* (2013.01); *B29L 2031/52* (2013.01)

(58) Field of Classification Search

CPC ... B29C 64/295; B29C 64/214; B29C 64/124; B29C 64/188; B29C 64/194; B33Y 10/00; B33Y 30/00; B33Y 70/00; B29K 2005/00; B29K 2033/08; B29K 2075/00; B29K 2105/0088; B29L 2031/52

See application file for complete search history.

(56) References Cited

U.S. PATENT DOCUMENTS

| | | | | |
|---|---|---|---|---|
| 5,525,051 | A * | 6/1996 | Takano | B29C 64/135 264/401 |
| 5,573,721 | A * | 11/1996 | Gillette | B33Y 10/00 118/712 |
| 6,500,378 | B1 * | 12/2002 | Smith | B29C 35/0805 425/375 |
| 2002/0195747 | A1 * | 12/2002 | Hull | B29C 64/124 425/375 |
| 2006/0022379 | A1 * | 2/2006 | Wicker | B33Y 70/00 264/401 |
| 2007/0075458 | A1 | 4/2007 | Wahlstrom et al. | |
| 2010/0201019 | A1 | 8/2010 | Lawton et al. | |
| 2012/0248657 | A1 | 10/2012 | Ebert et al. | |
| 2014/0002998 | A1 | 1/2014 | Pidwerbecki et al. | |
| 2015/0137426 | A1 * | 5/2015 | Van Esbroeck | B33Y 10/00 425/162 |

* cited by examiner

Honeycomb lattice printed with performance polyurethane

Printed polyurethanes exhibit high toughness and flexibility (>100 %). Part geometry is automatically restored after deformation.

HIGH-TEMPERATURE STEREOLITHOGRAPHY APPARATUS AND METHODS OF USE THEREOF

CROSS-REFERENCE TO RELATED APPLICATIONS

This application is the 35 U.S.C. § 371 national stage application of PCT Application No. PCT/US2018/065883, filed Dec. 15, 2018, where the PCT claims priority to, and the benefit of, U.S. provisional application entitled "APPARATUS FOR HIGH TEMPERATURE STEREOLITHOGRAPHY" having Ser. No. 62/599,287, filed Dec. 15, 2018.

TECHNICAL FIELD

The present disclosure generally relates to methods and systems for additive manufacturing.

BACKGROUND

Stereolithography (SLA) is an additive manufacturing process first reduced to practice in the 1980's by Chuck Hull. The technique fabricated three dimensional parts by using light (generally in the UV spectrum) to cure thin layers of photopolymer one atop of another. Photopolymers are a class of materials which, in the presence of a photoinitiator and light, undergo a chemical reaction that results in chain extension and/or crosslinking. In practice, when enough of these reactions have occurred, the resin (a mixture of at least photopolymer and photoinitiator) gels, or solidifies. By curing layers of varied shape and size, many three dimensional geometries can be constructed.

The photopolymer resins used in SLA are generally low viscosity (<3 Pa·s) as it is challenging to recoat thin layers of viscous material. SLA machines generally do not heat the resin, which means it must have a low viscosity at room temperature. To achieve this, the monomeric or oligomeric molecules are limited in their molecular weight. These machine constraints severely limit the types and molecular weights of the materials that can be processed via SLA. In conjunction with synthetic techniques, a high temperature SLA system that can process high viscosity resins would permit the processing of polymers that could not otherwise be processed.

Previous systems have, for example, relied upon a viscosity modifying solvent to reduce viscosity because they are unable to recoating in high viscosities (e.g. U.S. Pat. No. 6,656,410) or have applied only non-uniform heating (e.g. U.S. Pat. No. 9,079,357). Conventional systems are either not heated, or are heated to temperatures just a few degrees above ambient to provide stable temperatures during curing (e.g. U.S. Pat. No. 6,153,142), and require resins having generally low viscosities of about 3 Pa·s or less.

There remains a need for improved stereolithography apparatus and method that overcome the aforementioned deficiencies.

SUMMARY

In various aspects, top-down stereolithography apparatus and methods of use thereof are provided herein that overcome one or more of the aforementioned deficiencies with additive manufacturing of an article from a high-viscosity resin. The apparatus and methods can print resins having viscosities higher than conventional systems, e.g. viscosities up to about 100 Pa·s at the elevated temperature. The resin may have a room temperature viscosity of about 15 Pa·s to about 100 Pa·s, about 100 Pa·s to about 250 Pa·s, about 100 Pa·s to about 1000 Pa·s, or more. In some aspects, the resin is a solid at room temperature. The apparatus and methods do not rely upon solvents or other viscosity modifiers being added to the resin, and are capable of top-down additive manufacturing approaches which provide reduced stress on the printed article.

For example, various apparatus are provided having (i) a vat for containing the high-viscosity resin, the vat having a lower surface having at least one opening; (ii) a build platform within the at least one opening, wherein the build platform is incrementally movable vertically by a plurality of increments with respect to the lower surface of the vat, and wherein each of the increments in the plurality of increments defines a layer thickness in the article; (iii) a resin applicator within the vat, the resin applicator movable within the vat to scrape the resin across the at least one opening when the resin is in the vat, wherein the scraping of the resin across the at least one opening forms a smooth resin layer within the at least one opening, wherein the smooth resin layer is level with the lower surface; (iv) a light source positioned to project a patterned light onto the resin layer to cure at least a portion of the resin in the resin layer to form a layer of the article; and (v) a heating apparatus enclosing at least the vat, build platform, and resin applicator to heat the resin, when the resin is in the vat, to an elevated temperature with respect to room temperature during the additive manufacturing.

Various methods of manufacturing an article from a high-viscosity resin are also provided. The methods can be performed with any of the apparatus described herein. In some aspects, the method includes a layer-by-layer approach including uniformly heating the high-viscosity resin to an elevated temperature with respect to room temperature to form a heated resin; forming each layer of the article in a layer-by-layer approach by iteratively (i) forming a layer of the heated resin, and (ii) projecting a patterned light source onto the layer of the heated resin to cure at least a portion of the layer of the heated resin to form a layer of the article; wherein a first layer of the article is formed on a build platform; and wherein each subsequent layer of the article is formed on top of a previous layer of the article.

In some aspects, the method includes a layer-by-layer approach including (1) uniformly heating a high-viscosity resin to an elevated temperature with respect to room temperature to form a heated resin, wherein the heated resin is in a vat having a lower surface having at least one opening; (2) forming a first layer of the article by (i) positioning a build platform in the opening at a distance below the lower surface of the vat, the distance defining a layer thickness, (ii) scraping the heated resin across the at least one opening to form a layer of heated resin having a thickness equal to the layer thickness, (iii) projecting a patterned light source onto the layer of heated resin to cure at least a portion of the layer of heated resin to form the first layer of the article; (3) forming a subsequent layer of the article by (i) incrementally lowering the build platform in the opening a distance equal to the layer thickness, (ii) scraping the heated resin across the at least one opening to form a layer of heated resin having a thickness equal to the layer thickness, (iii) projecting a patterned light source onto the layer of heated resin to cure at least a portion of the layer of heated resin to form the subsequent layer of the article on top of the previous layer of the article; (4) repeating step (3) a number of times to form the article layer-by-layer.

Other systems, methods, features, and advantages of top-down stereolithography apparatus and methods of use will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Further aspects of the present disclosure will be readily appreciated upon review of the detailed description of its various embodiments, described below, when taken in conjunction with the accompanying drawings.

(FIG. 7B), and in a printed chess piece (FIG. 7C) as described in the examples.

DETAILED DESCRIPTION

Figure 1:
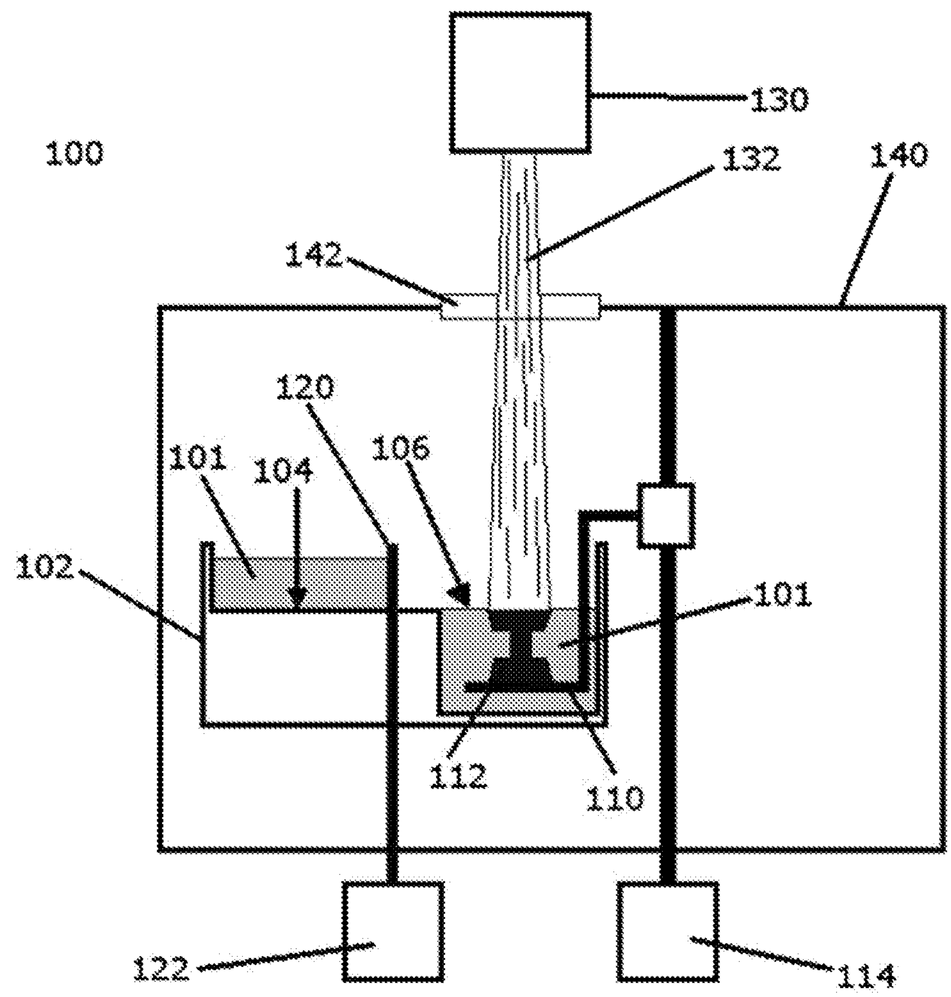
FIG. 1 is a schematic of an exemplary top-down stereolithography apparatus for the layer-by-layer additive manufacturing of an article from a high-viscosity resin according to various aspects of the disclosure.
Figures 2A, 2B, 2C, 2D, 2E, 2F:
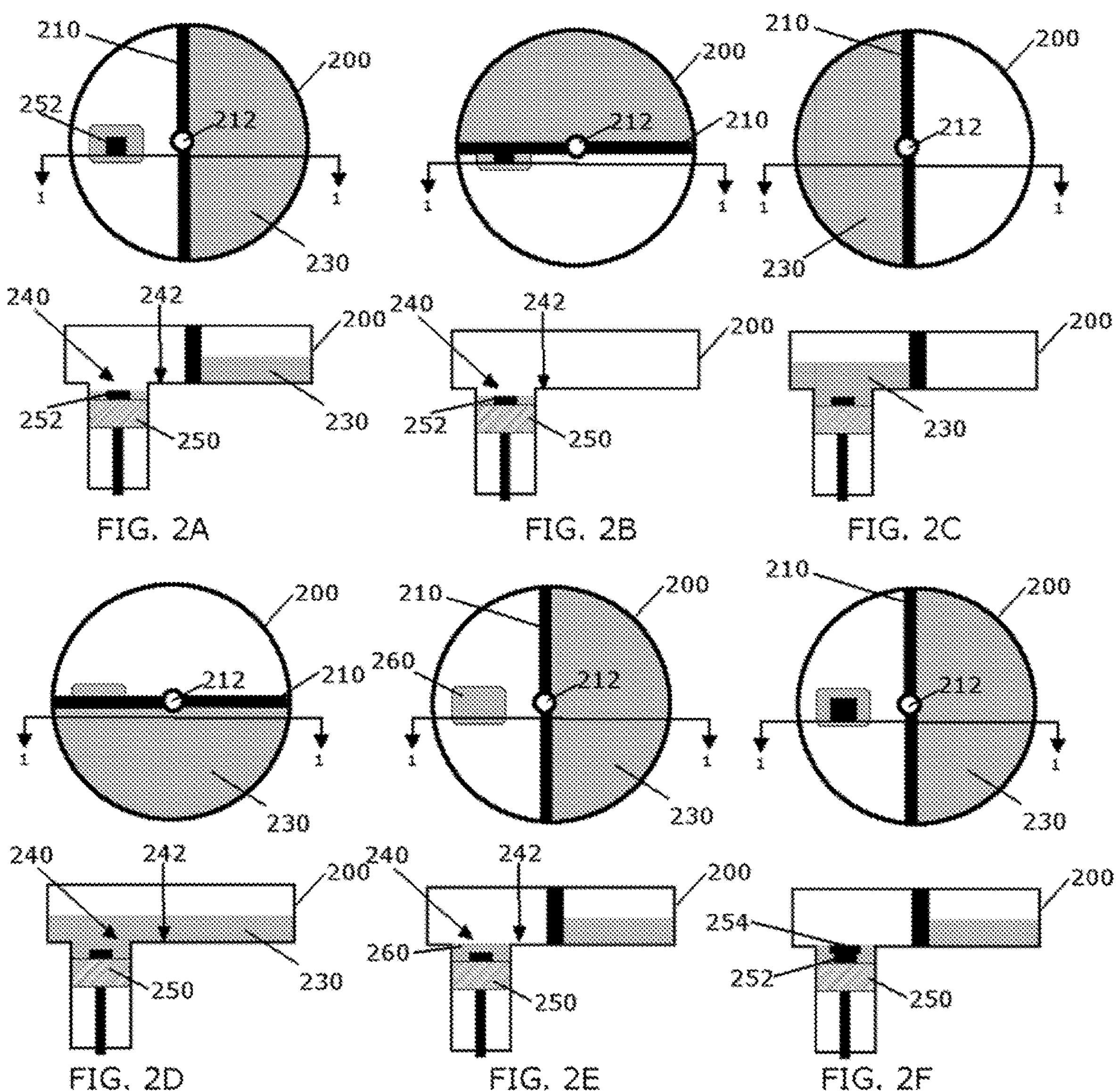
FIGS. 2A-2F are schematics depicting operation of an exemplary vat for a top-down stereolithography apparatus with a cylindrical vat and a revolving recoat blade rotatable about a central axis of the vat. In each of FIGS. 2A-2F, the upper figure is a top view of the exemplary vat and the lower figure is a section view along 1-1 from the top view.
Figures 3A, 3B, 3C, 3D:
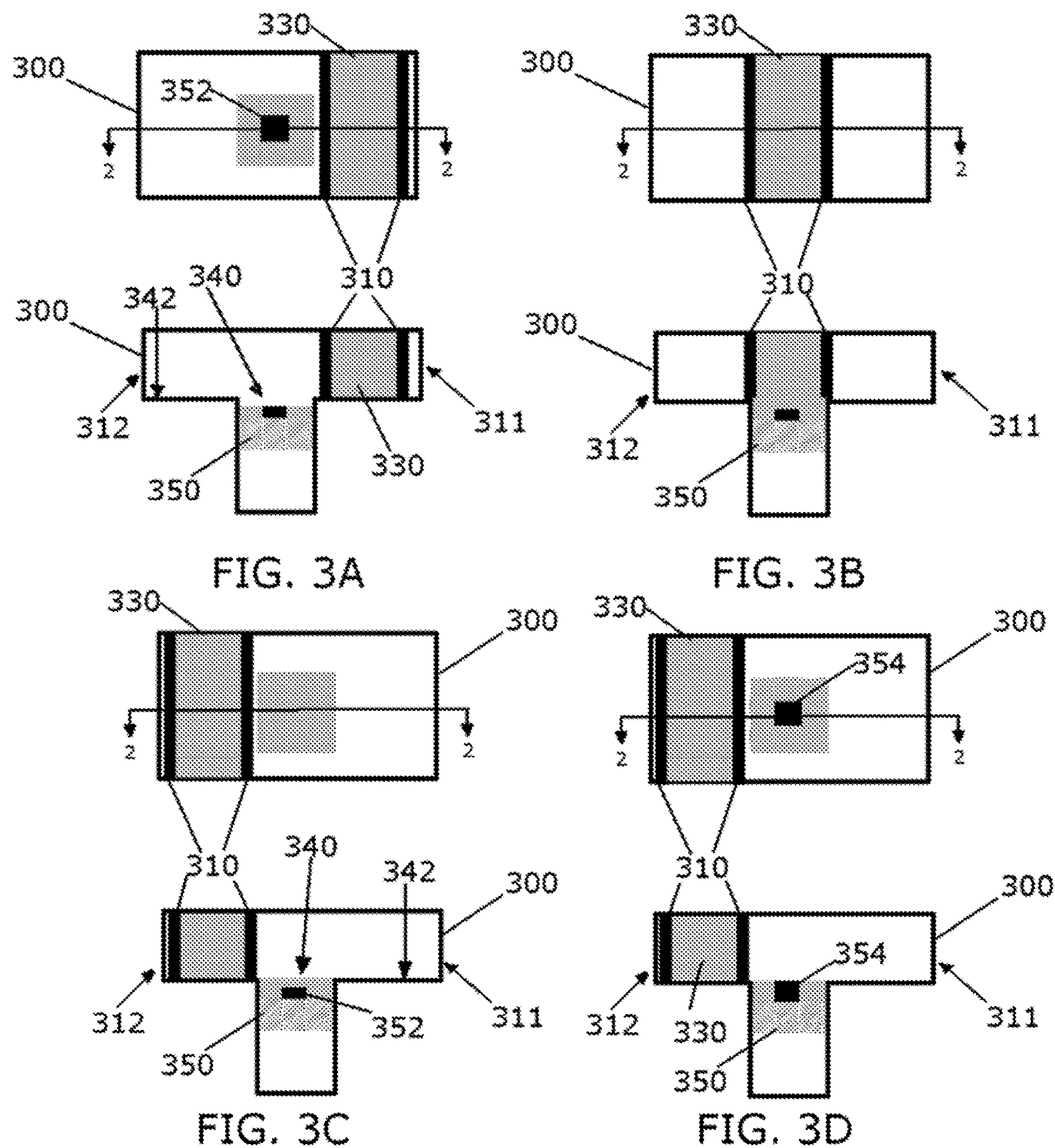
FIGS. 3A-3D are schematics depicting operation of an exemplary vat for a top-down stereolithography apparatus with a rectangular vat and a pair of slideable recoat blades moveable from a first position to a second position within the vat. In each of FIGS. 3A-3D, the upper figure is a top view of the exemplary vat and the lower figure is a section view along 2-2 from the top view.

In various aspects, top-down stereolithography apparatus and methods of use thereof are provided herein that overcome one or more of the aforementioned deficiencies with additive manufacturing of an article from a high-viscosity resin. The apparatus and methods can print resins having viscosities higher than conventional systems, e.g. viscosities up to about 100 Pa·s at the elevated temperature. The resin may have a room temperature viscosity of about 15 Pa·s to about 100 Pa·s, about 100 Pa·s to about 250 Pa·s, about 100 Pa·s to about 1000 Pa·s, or more. In some aspects, the resin is a solid at room temperature. The apparatus and methods do not rely upon solvents or other viscosity modifiers being added to the resin, and are capable of top-down additive manufacturing approaches which provide reduced stress on the printed article.

Before the present disclosure is described in greater detail, it is to be understood that this disclosure is not limited to particular embodiments described, and as such may, of course, vary. It is also to be understood that the terminology used herein is for the purpose of describing particular embodiments only, and is not intended to be limiting. The skilled artisan will recognize many variants and adaptations of the embodiments described herein. These variants and adaptations are intended to be included in the teachings of this disclosure.

All publications and patents cited in this specification are cited to disclose and describe the methods and/or materials in connection with which the publications are cited. All such publications and patents are herein incorporated by references as if each individual publication or patent were specifically and individually indicated to be incorporated by reference. Such incorporation by reference is expressly limited to the methods and/or materials described in the cited publications and patents and does not extend to any lexicographical definitions from the cited publications and patents. Any lexicographical definition in the publications and patents cited that is not also expressly repeated in the instant specification should not be treated as such and should not be read as defining any terms appearing in the accompanying claims. The citation of any publication is for its disclosure prior to the filing date and should not be construed as an admission that the present disclosure is not entitled to antedate such publication by virtue of prior disclosure. Further, the dates of publication provided could be different from the actual publication dates that may need to be independently confirmed.

Although any methods and materials similar or equivalent to those described herein can also be used in the practice or testing of the present disclosure, the preferred methods and materials are now described. Functions or constructions well-known in the art may not be described in detail for brevity and/or clarity. Embodiments of the present disclosure will employ, unless otherwise indicated, techniques of nanotechnology, organic chemistry, material science, engineering and the like, and in particular areas of additive manufacturing and stereolithographic techniques, and analogous areas which are within the skill of the art. Such techniques are explained fully in the literature.

It should be noted that ratios, concentrations, amounts, and other numerical data can be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to about 5%" should be interpreted to include not only the explicitly recited values of about 0.1% to about 5%, but also include individual values (e.g., 1%, 2%, 3%, and 4%) and the sub-ranges (e.g., 0.5%, 1.1%, 2.2%, 3.3%, and 4.4%) within the indicated range. Where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In some embodiments, the term "about" can include traditional rounding according to significant figures of the numerical value. In addition, the phrase "about 'x' to 'y'", where 'x' and 'y' are numerical values, includes "about 'x' to about 'y'".

In some instances, units may be used herein that are non-metric or non-SI units. Such units may be, for instance, in U.S. Customary Measures, e.g., as set forth by the National Institute of Standards and Technology, Department of Commerce, United States of America in publications such as NIST HB 44, NIST HB 133, NIST SP 811, NIST SP 1038, NBS Miscellaneous Publication 214, and the like. The units in U.S. Customary Measures are understood to include equivalent dimensions in metric and other units (e.g., a dimension disclosed as "1 inch" is intended to mean an equivalent dimension of "2.5 cm"; a unit disclosed as "1 pcf" is intended to mean an equivalent dimension of 0.157 $kN/m^3$; or a unit disclosed 100° F. is intended to mean an equivalent dimension of 37.8° C.; and the like) as understood by a person of ordinary skill in the art.

Unless defined otherwise, all technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the specification and relevant art and should not be interpreted in an idealized or overly formal sense unless expressly defined herein.

The articles "a" and "an," as used herein, mean one or more when applied to any feature in embodiments of the present invention described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used.

Stereolithography Apparatus and Methods of Use Thereof

Various apparatus are provided for the top-down layer-by-layer additive manufacturing of an article from a high-viscosity resin. The apparatus and methods of use thereof overcome deficiencies in previous methods and apparatus for additive manufacturing. In particular aspects, the apparatus and methods can be used to print resins having viscosities of about 15 Pa·s. to about 50 Pa·s at room temperature, about 50 Pa·s to about 100 Pa·s at room temperature, about 100 Pa·s to about 250 Pa·s at room temperature, or about 100 Pa·s to about 1000 Pa·s at room temperature. In some aspects, the apparatus and methods can be used to print from resins that are solids at room temperature.

The apparatus and methods are capable of manufacturing articles from a high viscosity resin without the addition of solvents or other viscosity modifiers to the resin. Solvents and viscosity modifiers impact the types of resins that can be used as well as the properties of the final cured article and/or can produce large amounts of wasted solvent. The apparatus and methods can decrease the viscosity of the resin just enough to be used for the additive manufacturing by heating to an elevated temperature. In the various aspects, the resin is heated uniformly in the vat which avoids distortions in the optical and mechanical properties of the resin and the printed article arising from non-uniform heating. This can be accomplished by placing the vat containing the resin and the build stage within a heating apparatus, e.g. a convection oven or some other heating apparatus providing a uniform heating within its interior. In various aspects, the elevated temperature is about 50° C., 80° C., 100° C., or 120° C. up to about 100° C., 200° C., 250° C., 300° C., or any interval there between.

In various aspects, apparatus are provided having (i) a vat for containing the high-viscosity resin, the vat having a lower surface having at least one opening; (ii) a build platform within the at least one opening, wherein the build platform is incrementally movable vertically by a plurality of increments with respect to the lower surface of the vat, and wherein each of the increments in the plurality of increments defines a layer thickness in the article; (iii) a resin applicator within the vat, the resin applicator movable within the vat to scrape the resin across the at least one opening when the resin is in the vat, wherein the scraping of the resin across the at least one opening forms a smooth resin layer within the at least one opening, wherein the smooth resin layer is level with the lower surface; (iv) a light source positioned to project a patterned light onto the resin layer to cure at least a portion of the resin in the resin layer to form a layer of the article; and (v) a heating apparatus enclosing at least the vat, build platform, and resin applicator to heat the resin, when the resin is in the vat, to an elevated temperature with respect to room temperature during the additive manufacturing.

An exemplary apparatus 100 is depicted in FIG. 1 including a vat 102 for containing the high-viscosity resin 101. The vat has a lower surface 104 having one opening 106. The apparatus 100 has a build platform 110 within the at least one opening 106, wherein the build platform 110 is incrementally movable vertically by a plurality of increments with respect to the lower surface 104. The article 112 can be built in a layer-by-layer fashion on the build platform 110. The build platform 110 is incrementally movable over a plurality of increments via coupling to a linear actuator 114. Each of the increments in the plurality of increments defines a layer thickness in the article 112. A resin applicator 120 within the vat 102, the resin applicator 120 movable within the vat 102 to scrape the resin 101 across the at least one opening 106 when the resin 101 is in the vat 102, wherein the scraping of the resin 101 across the at least one opening 106 forms a smooth resin layer within the at least one opening 106, wherein the smooth resin layer is level with the lower surface 104. The resin applicator 120 is movable via coupling to a rotary actuator 122. The apparatus 100 includes a light source 130 positioned to project a patterned light 132 onto the resin layer to cure at least a portion of the resin 101 in the resin layer to form a layer of the article 112. The apparatus 100 includes a heating apparatus 140 enclosing the vat 102, build platform 110, and resin applicator 120 to heat the resin 101 to an elevated temperature with respect to room temperature during the additive manufacturing. The heating apparatus 140 also includes an optically transparent window 142 to allow the patterned light 132 to be projected onto the resin layer to within.

Those skilled in the art will envision various geometries and structures for the vat and the resin applicator. In some aspects, the vat is structured so that no resin applicator is needed and the resin, when heated, will recoat via gravity.

In some aspects, the vat is a cylindrical vat, and the resin applicator includes a revolving recoat blade rotatable about a central axis of the vat. As depicted in FIGS. 2A-2F, the vat 200 includes a revolving recoat blade 210 rotatable about a central axis 212 of the vat 200. As the revolving recoat blade 210 rotates counterclockwise from FIG. 2A to FIG. 2B to FIG. 2C, the resin 230 is scraped onto the opening 240 in the lower surface 242 and over the build platform 250 and the previous layer of the article 252 on the build platform 250. As the revolving recoat blade 210 further rotates from FIG. 2C to FIG. 2D to FIG. 2E (back to the starting position from FIG. 2A), the resin 230 is scraped away from the opening 240 to leave a single layer 260 of the resin 230 in the opening 240 in the lower surface 242 and over the previous layer of the article 252. Patterned curing of the single layer of resin 260 then produces the subsequent layer of the article 254.

In alternative aspects, the vat is a rectangular vat; and the resin applicator is a pair of slideable recoat blades moveable from a first position to a second position within the vat. For example, as depicted in FIGS. 3A-3D, a rectangular vat 300 includes a pair of recoat blades 310 that are slideable from a first end 311 to a second end 312 (and vice versa). As the pair of recoat blades 310 move in going from FIG. 3A to FIG. 3B the resin 330 is scraped onto the opening 340 in the lower surface 342 and over the build platform 350 and the previous layer of the article 352 on the build platform 350. As the pair of recoat blades 310 move in going from FIG. 3*b* to FIG. 3C the resin 330 is scraped away from the opening 340 to leave a single layer 360 of the resin 330 in the opening 340 in the lower surface 342 and over the previous layer of the article 352. Patterned curing of the single layer of resin 360 then produces the subsequent layer of the article 354.

The apparatus can include a light source for projecting a pattern onto the resin layer for patterning or forming each layer of the article. A variety of photocurable resins and polymers are known in the art, and in principal the apparatus can use any photocurable resin having a high viscosity. It will be understood that the light source must be chosen to work with the photocurable resin and/or with any photo initiator that can be used with the chosen resin. In some aspects, the light source is an actinic radiation source. The light source can include a laser, a light-emitting diode, a liquid crystal display, or a combination thereof. The light source can include a UV light source, a visible light source, or a combination thereof. The light source can have a wavelength of about 200 nm to about 400 nm or about 400 nm to about 700 nm.

In some aspects, the light source includes a pattern-forming element operatively associated with a controller. Suitable light sources can include a digital micromirror device (DMD), a spatial light modulator (SLM), a micro-electromechanical system (MEMS) mirror array, a mask, a reticle, or a combination thereof.

Various methods of manufacturing an article from a high-viscosity resin are also provided. The methods can be performed with any of the apparatus described herein. In some aspects, the method includes a layer-by-layer approach including uniformly heating the high-viscosity resin to an elevated temperature with respect to room temperature to form a heated resin; forming each layer of the article in a layer-by-layer approach by iteratively (i) forming a layer of the heated resin, and (ii) projecting a patterned light source onto the layer of the heated resin to cure at least a portion of the layer of the heated resin to form a layer of the article; wherein a first layer of the article is formed on a build platform; and wherein each subsequent layer of the article is formed on top of a previous layer of the article.

In some aspects, the method includes a layer-by-layer approach including (1) uniformly heating a high-viscosity resin to an elevated temperature with respect to room temperature to form a heated resin, wherein the heated resin is in a vat having a lower surface having at least one opening; (2) forming a first layer of the article by (i) positioning a build platform in the opening at a distance below the lower surface of the vat, the distance defining a layer thickness, (ii) scraping the heated resin across the at least one opening to form a layer of heated resin having a thickness equal to the layer thickness, (iii) projecting a patterned light source onto the layer of heated resin to cure at least a portion of the layer of heated resin to form the first layer of the article; (3) forming a subsequent layer of the article by (i) incrementally lowering the build platform in the opening a distance equal to the layer thickness, (ii) scraping the heated resin across the at least one opening to form a layer of heated resin having a thickness equal to the layer thickness, (iii) projecting a patterned light source onto the layer of heated resin to cure at least a portion of the layer of heated resin to form the subsequent layer of the article on top of the previous layer of the article; (4) repeating step (3) a number of times to form the article layer-by-layer.

In some aspects, the resins can be used without added solvent or viscosity modifiers. This system does not preclude solvents from being added, and in some aspects the methods are used with solvents. Solvents or other viscosity modifiers will have to have lower vapor pressures and higher boiling points than in other systems. For example, acetone would not be suitable. In some aspects, the resins are used with solvents having boiling points of about 120° C., about 150° C., about 180° C., about 210° C., or more. In some aspects, the solvents are solids at room temperature. In some aspects, the resins can be used with added solvents such as n-methyl pyrrolidone or diphenyl sulfone, which is a solid at room temperature.

EXAMPLES

Now having described the embodiments of the present disclosure, in general, the following Examples describe some additional embodiments of the present disclosure. While embodiments of the present disclosure are described in connection with the following examples and the corresponding text and figures, there is no intent to limit embodiments of the present disclosure to this description. On the contrary, the intent is to cover all alternatives, modifications, and equivalents included within the spirit and scope of embodiments of the present disclosure.

Example 1: Chess Piece Printed from Commercial Resins

Materials: Formlabs Tough (commercial resin)

Methods: 65 ml of the resin was transferred into the aluminum vat in the machine. The machine was heated to 80° C. The STL file of the Rook was sliced with a layer thickness of 80 μm using the Formlabs Preform software and the resultant G-Code was sent to the machine. The scan speed was set to 1400 mm/s, and the laser intensity was 62 mW. Upon completion of manufacturing, the part was extracted and cleaned in 1-Propanol.

Figures 4, 5:
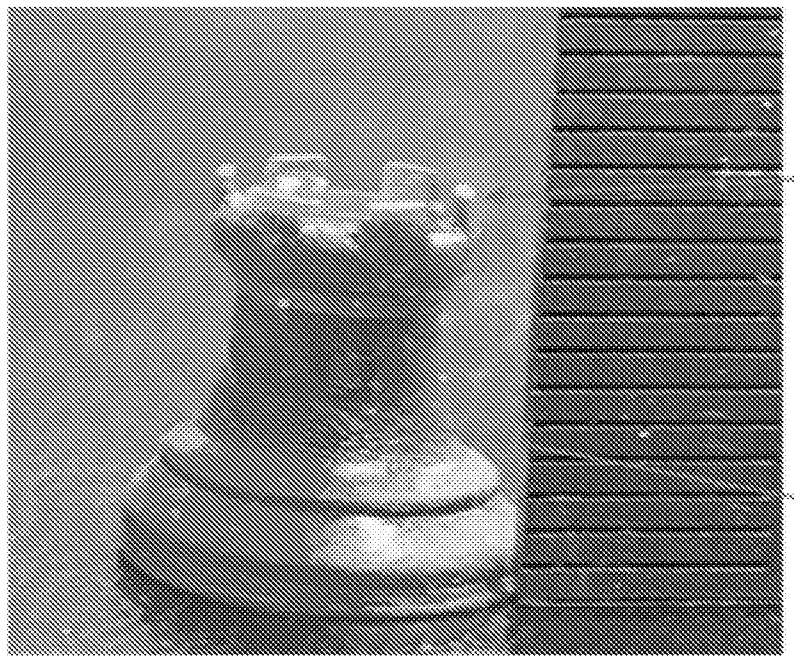
FIG. 4 is an image of a chess piece fabricated layer-by-layer from Formlabs Tough (commercial resin) as described in the examples.
FIG. 5 is an image of a chess piece fabricated layer-by-layer from a mixture of guar gum and Ember standard clear prototyping resin (PR48) as described in the examples.

An image of the printed piece is depicted in FIG. 4 demonstrating features as small as 0.5 mm printed without damage from the resin recoating.

Example 2: Chess Piece Printed from Guar Gum and Ember Standard Clear Prototyping Resin Materials: 1:1 mixture (by weight) of Guar-gum mixed and Ember Standard Clear Prototyping Resin (PR48). Resin viscosity >30 Pa·s Methods: 65 mL of the resin was transferred into the aluminum vat in the machine. The STL file of the Rook was sliced with a layer thickness of 80 μm using the Formlabs Preform software and the resultant G-Code was sent to the machine. The scan speed was set to 1550 mm/s, and the laser intensity was 62 mW. Upon completion of manufacturing, the part was cleaned with kimwipes and 1-Propanol An image of the printed piece is depicted in FIG. 5 demonstrating features as small as 0.5 mm printed without damage from the resin recoating.

Example 3: Honeycomb Structure Printed from Performance Polyurethane Resin

Materials: 70 wt. % polyurethane and 30 wt. % of isobornyl acrylate. (Procured from Allnex-EBECRYL 242) with 1 wt. % of TPO (photoinitiator). Resin viscosity >100 Pa·s at room temp. Resin viscosity=0.4 Pa·s at 100° C.

Methods: 65 ml of the resin was transferred into the aluminum vat in the machine. The STL file of the honeycomb structure was sliced with a layer thickness of 80 μm using the Formlabs Preform software and the resultant G-Code was sent to the machine. The scan speed was set to 1000 mm/s, and the laser intensity was 62 mW. Upon completion of manufacturing, the part was cleaned with kimwipes and Ethanol.

Figure 6:
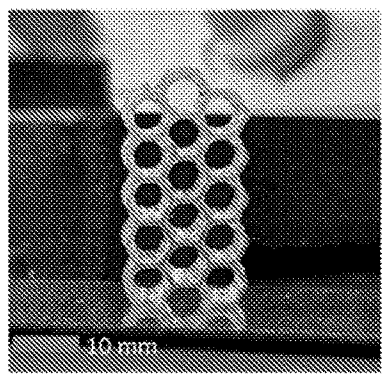
FIG. 6 is an image of a honeycomb lattice printed with a performance polyurethane resin as printed (left) and mechanically compressed (right) as described in the examples. The geometry is automatically restored upon removal of the mechanical compression force.
Figure 6:
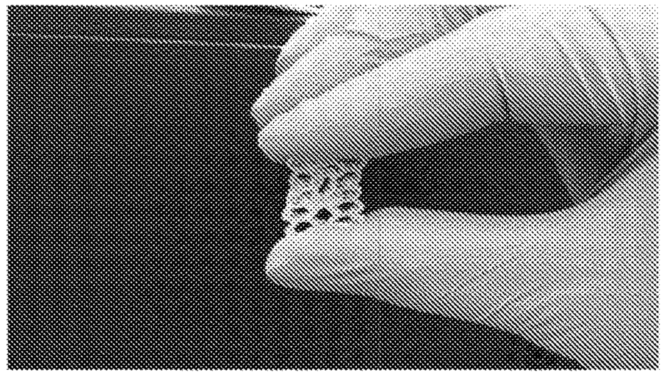

An image of the printed article is depicted in FIG. 6 demonstrating a well defined honeycomb structure (left image) with thin walls on the order of about 1 mm or less that exhibits both high toughness and flexibility (greater than 100% flexibility) (right image).

Example 4: Chess Piece Printed from a Solid Resin of Urea Monoacrylate+PEGDA 575 (1:1 by Weight)

Materials: Urea monoacrylate+PEGDA 575 (1:1 by weight), TPO 1 wt. % (photoinitiator), MEHQ 0.5 wt % (inhibitor). Resin is a solid at room temperature, liquid with a viscosity=0.05 Pa·s at 80° C.

Methods: 65 mL of the resin was transferred into the aluminum vat in the machine. The STL file of the chess piece was sliced with a layer thickness of 80 μm using the Formlabs Preform software and the resultant G-Code was sent to the machine. The scan speed was set to 1550 mm/s, and the laser intensity was 62 mW. Upon completion of manufacturing, the part was cleaned with kimwipes and Ethanol.

Figure 7A:
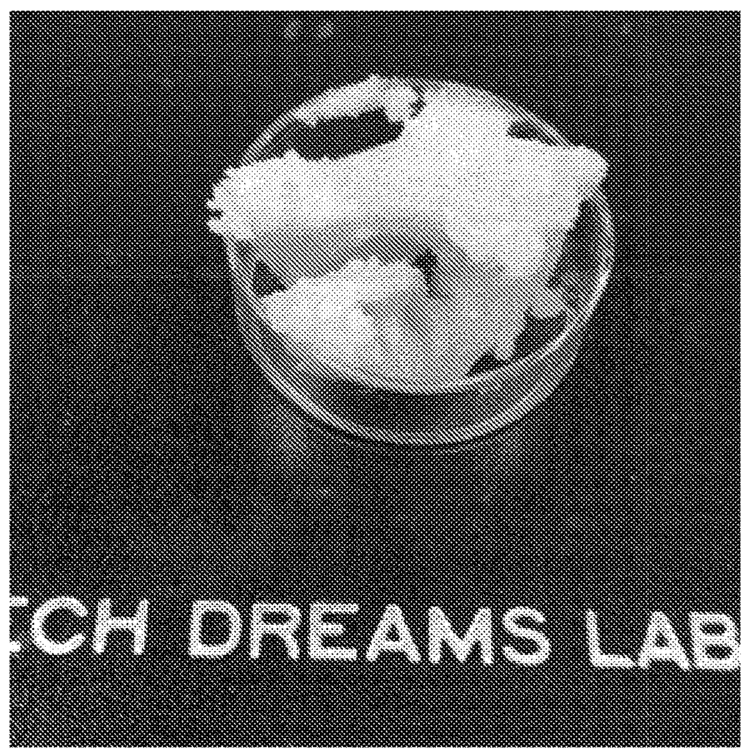
FIGS. 7A-7C are images of a Urea monoacrylate+ PEGDA 575 (1:1 by weight) resin at room temperature (FIG. 7A), heated to a temperature of 80° C.
Figures 7B, 7C:
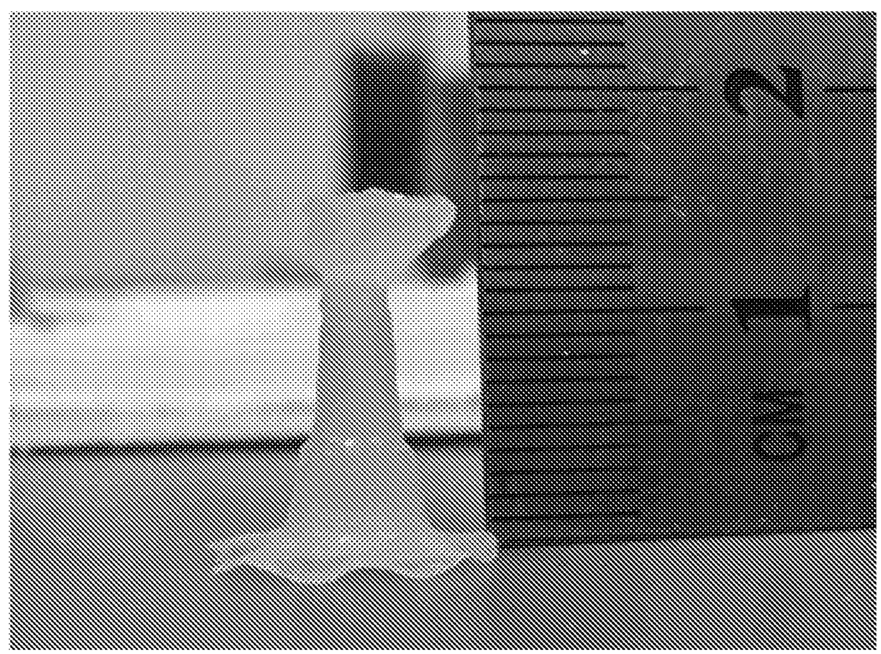

The solid resin at room temperature is depicted in FIG. 7A, which melts to a liquid having a viscosity of about 0.05 Pa·s at 80° C. (FIG. 7B). At 80° C., the resin can be readily printed to form articles such as the chess piece depicted in FIG. 7C.

Example 5: Chess Piece Printed from Bisphenol-A Dimethacrylate

Figure 8:
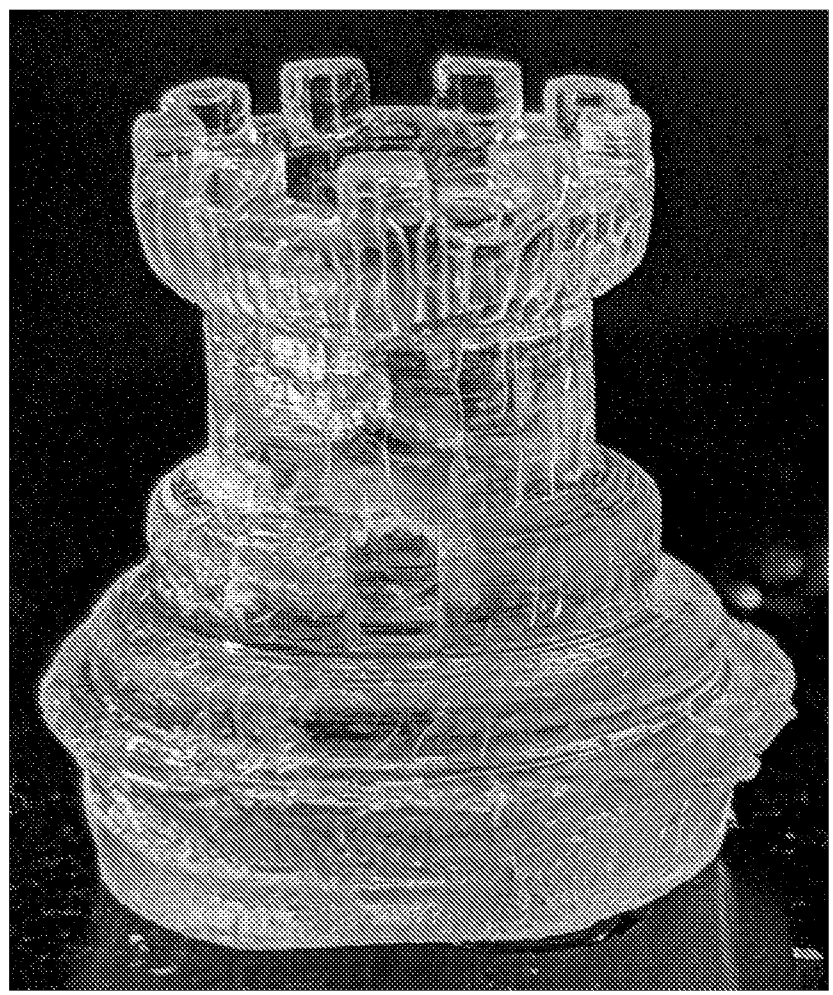
FIG. 8 is an image of a chess piece fabricated layer-by-layer from bisphenol-A dimethacrylate resin with 1 wt % TPO photoinitiator (diphenyl(2,4,6-trimethylbenzoyl)phosphine oxide) as described in the examples.

Bisphenol A dimethacrylate is a photopolymer that is incorporated into dental resins because it is extremely hard. However, it is a solid at room temperature, and is thus blended with other photopolymers (e.g., triethylene glycol dimethacrylate) to form a viscous resin that can be used in fillings. In this example, bisphenol-A dimethacrylate (melting point 72-74° C.) was melted at approximately 100° C. and 1 wt % diphenyl(2,4,6-trimethylbenzoyl)phosphine oxide (TPO, melting point 88-92° C.) photoinitiator was dissolved into the melt. At elevated temperature, the resin was relatively low viscosity (<5 Pa□s). The resin was poured into the 3D printer, which was heated to approximately 100° C., and a rook fabricated (FIG. 8). Cracking or crazing on the surface is due to the extremely high crosslink density of the polymer, its brittleness, and the use of solvent that slightly swelled the part during cleaning. After cooling the resin to room temperature, it again became solid. No solvent was used as the resin was processed in the melt state. Crenellations and a door opening into a hollow center demonstrate the level of detail possible. The rook is approximately 12 mm tall.

It should be emphasized that the above-described embodiments of the present disclosure are merely possible examples of implementations, and are set forth only for a clear understanding of the principles of the disclosure. Many variations and modifications may be made to the above-described embodiments of the disclosure without departing substantially from the spirit and principles of the disclosure. All such modifications and variations are intended to be included herein within the scope of this disclosure.

The various aspects of the disclosure will be better understood upon review of the following clauses which should not be confused with the claims.

Clause 1. A top-down stereolithography apparatus for the layer-by-layer additive manufacturing of an article from a high-viscosity resin, the top-down stereolithography apparatus comprising: (i) a vat for containing the high-viscosity resin, the vat having a lower surface having at least one opening; (ii) a build platform within the at least one opening, wherein the build platform is incrementally movable vertically by a plurality of increments with respect to the lower surface of the vat, and wherein each of the increments in the plurality of increments defines a layer thickness in the article; (iii) a resin applicator within the vat, the resin applicator movable within the vat to scrape the resin across the at least one opening when the resin is in the vat, wherein the scraping of the resin across the at least one opening forms a smooth resin layer within the at least one opening, wherein the smooth resin layer is level with the lower surface; (iv) a light source positioned to project a patterned light onto the resin layer to cure at least a portion of the resin in the resin layer to form a layer of the article; and (v) a heating apparatus enclosing at least the vat, build platform, and resin applicator to heat the resin, when the resin is in the vat, to an elevated temperature with respect to room temperature during the additive manufacturing.

Clause 2. The top-down stereolithography apparatus according to any one of Clauses 1-18, wherein the vat comprises a cylindrical vat; and wherein the resin applicator comprises a revolving recoat blade rotatable about a central axis of the vat.

Clause 3. The top-down stereolithography apparatus according to any one of Clauses 1-18, wherein the vat comprises a rectangular vat; and wherein the resin applicator comprises a pair of slideable recoat blades moveable from a first position to a second position within the vat.

Clause 4. The top-down stereolithography apparatus according to any one of Clauses 1-18, wherein the light source comprises an actinic radiation source.

Clause 5. The top-down stereolithography apparatus according to any one of Clauses 1-18, wherein the light source comprises a laser, a light-emitting diode, a liquid crystal display, or a combination thereof.

Clause 6. The top-down stereolithography apparatus according to any one of Clauses 1-18, wherein the light source comprises an ultraviolet light source.

Clause 7. The top-down stereolithography apparatus according to any one of Clauses 1-18, wherein the light source comprises a pattern-forming element operatively associated with a controller.

Clause 8. The top-down stereolithography apparatus according to any one of Clauses 1-18, wherein the light source comprises a digital micromirror device (DMD), a spatial light modulator (SLM), a microelectromechanical system (MEMS) mirror array, a mask, a reticle, or a combination thereof.

Clause 9. The top-down stereolithography apparatus according to any one of Clauses 1-18, further comprising a linear actuator coupled to the build platform and configured to effectuate movement of the build platform with respect to the lower surface of the vat.

Clause 10. The top-down stereolithography apparatus according to any one of Clauses 1-18, further comprising a rotary actuate coupled to the revolving recoat blade and configured to effectuate rotation of the revolving recoat blade about the central axis of the vat.

Clause 11. The top-down stereolithography apparatus according to any one of Clauses 1-18, wherein the resin applicator and the resin in the resin vat are at the same elevated temperature during the additive manufacturing.

Clause 12. The top-down stereolithography apparatus according to any one of Clauses 1-18, wherein the resin in the resin vat is uniformly heated to the elevated temperature during the additive manufacturing.

Clause 13. The top-down stereolithography apparatus according to any one of Clauses 1-18, wherein the patterned light is projected onto the resin layer from above during the additive manufacturing.

Clause 14. The top-down stereolithography apparatus according to any one of Clauses 1-18, wherein the light source external to the heating apparatus; and wherein the apparatus further comprises an optical window through which the patterned light is projected onto the resin layer.

Clause 15. The top-down stereolithography apparatus according to any one of Clauses 1-18, wherein the elevated temperature is about 50° C. to about 350° C., about 80° C. to about 300° C., or about 100° C. to about 250° C.

Clause 16. The top-down stereolithography apparatus according to any one of Clauses 1-18, wherein the layer thickness is about 10 μm to about 100 μm.

Clause 17. The top-down stereolithography apparatus according to any one of Clauses 1-18, wherein wires and electronic components within the heating apparatus comprise a thermal protective coating.

Clause 18. The top-down stereolithography apparatus according to any one of Clauses 1-17, wherein the resin applicator is configured to recoat a resin having a viscosity up to about 100 Pa·s at the elevated temperature.

Clause 19. A method of manufacturing an article from a high-viscosity resin in a layer-by-layer approach, the method comprising: uniformly heating the high-viscosity resin to an elevated temperature with respect to room temperature to form a heated resin; forming each layer of the article in a layer-by-layer approach by iteratively (i) forming a layer of the heated resin, and (ii) projecting a patterned light source onto the layer of the heated resin to cure at least a portion of the layer of the heated resin to form a layer of the article; wherein a first layer of the article is formed on a build platform; and wherein each subsequent layer of the article is formed on top of a previous layer of the article.

Clause 20. A method of manufacturing an article from a high-viscosity resin in a layer-by-layer approach, the method comprising: (1) uniformly heating a high-viscosity resin to an elevated temperature with respect to room temperature to form a heated resin, wherein the heated resin is in a vat having a lower surface having at least one opening; (2) forming a first layer of the article by (i) positioning a build platform in the opening at a distance below the lower surface of the vat, the distance defining a layer thickness, (ii) scraping the heated resin across the at least one opening to form a layer of heated resin having a thickness equal to the layer thickness, (iii) projecting a patterned light source onto the layer of heated resin to cure at least a portion of the layer of heated resin to form the first layer of the article; (3) forming a subsequent layer of the article by (i) incrementally lowering the build platform in the opening a distance equal to the layer thickness, (ii) scraping the heated resin across the at least one opening to form a layer of heated resin having a thickness equal to the layer thickness, (iii) projecting a patterned light source onto the layer of heated resin to cure at least a portion of the layer of heated resin to form the subsequent layer of the article on top of the previous layer of the article; (4) repeating step (3) a number of times to form the article layer-by-layer.

Clause 21. The method according to any one of Clauses 19-39, wherein the light source comprises an actinic radiation source.

Clause 22. The method according to any one of Clauses 19-39, wherein the light source comprises a laser, a light-emitting diode, a liquid crystal display, or a combination thereof.

Clause 23. The method according to any one of Clauses 19-39, wherein the light source comprises an ultraviolet light source (e.g. having a wavelength from about 200 nm to about 400 nm), visible light source (e.g. having a wavelength from about 400 nm to about 700 nm), or a combination thereof.

Clause 24. The method according to any one of Clauses 19-39, wherein the light source comprises a pattern-forming element operatively associated with a controller.

Clause 25. The method according to any one of Clauses 19-39, wherein the light source comprises a digital micromirror device (DMD), a spatial light modulator (SLM), a microelectromechanical system (MEMS) mirror array, a mask, a reticle, or a combination thereof.

Clause 26. The method according to any one of Clauses 19-39, wherein the resin in the resin vat is uniformly heated to the elevated temperature during the additive manufacturing.

Clause 27. The method according to any one of Clauses 19-39, wherein the patterned light is projected onto the resin layer from above during the additive manufacturing.

Clause 28. The method according to any one of Clauses 19-39, wherein the elevated temperature is about 50° C. to about 350° C., about 80° C. to about 300° C., or about 100° C. to about 250° C.

Clause 29. The method according to any one of Clauses 19-39, wherein the layer thickness is about 10 μm to about 100 μm.

Clause 30. The method according to any one of Clauses 19-39, wherein the resin has a viscosity at room temperature of about 15 Pa·s. to about 50 Pa·s.

Clause 31. The method according to any one of Clauses 19-39, wherein the resin has a viscosity at room temperature of about 80 Pa·s. to about 250 Pa·s, or about 100 Pa Pa·s to about 500 Pa·s, or wherein the resin is a solid at room temperature.

Clause 32. The method according any one of Clauses 19-39, wherein the resin is a solid at room temperature.

Clause 33. The method according to any one of Clauses 19-39, wherein the heated resin has a viscosity of about 5 Pa·s or less at the elevated temperature.

Clause 34. The method according to any one of Clauses 19-39, wherein the heated resin has a viscosity of about 5 Pa·s to about 50 Pa·s or about 50 Pa·s to about 100 Pa·s or about 80 Pa·s to about 120 Pa·s at the elevated temperature.

Clause 35. The method according to any one of Clauses 19-39, wherein the resin comprises a polymer selected from the group consisting of a polyetherimide, a polyphenylene sulfide, a polyarylether ketone, a polyamide, a polyamide-imide, a thermoplastic polyimide, a copolymer thereof, and a blend thereof.

Clause 36. The method according to any one of Clauses 19-39, wherein the resin comprises a high temperature thermoplastic, a high temperature thermoset, a high temperature pseudo-thermoplastic, or a combination thereof.

Clause 37. The method according to any one of Clauses 19-39, wherein the resin is a solid at room temperature, and the method further comprises melting the solid resin and dissolving a photoinitiator in the melted resin.

Clause 38. The method according to any one of Clauses 19-39, wherein the resin is solvent-free.

Clause 39. The method according to any one of Clauses 19-39, wherein the article comprises features having dimensions from about 0.01 mm or 0.1 mm to about 0.5 mm or 1 mm.

Clause 40. The method according to any one of Clauses 19-39, wherein the method is performed using an apparatus according to any one of Clauses 1-18.

We claim:

1. A top-down stereolithography apparatus for layer-by-layer additive manufacturing of an article from a high-viscosity resin, the top-down stereolithography apparatus comprising:

- a vat for containing the high-viscosity resin, the vat having a first area comprising a lower surface, the vat further having at least one opening in the lower surface that opens to a second area of the vat that extends vertically below the lower surface;
- a build platform within the second area, wherein the build platform is incrementally movable vertically by a plurality of increments with respect to the lower surface of the vat, and wherein each of the increments in the plurality of increments defines a layer thickness in the article;
- a resin applicator within the vat, the resin applicator comprising at least one recoat blade that holds a portion of the resin within a portion of the first area of the vat comprising the lower surface so that the portion of the resin is positioned above the lower surface of the first area and away from the at least one opening, the at least one recoat blade of the resin applicator movable within the vat to scrape the portion of the resin across the at least one opening that opens to the second area in the vat and away from the at least one opening, wherein the scraping of the portion of the resin across the at least one opening forms a smooth resin layer within the at least one opening, wherein an upper surface of the smooth resin layer is level with the lower surface of the first area of the vat that holds the portion of the resin;
- a light source positioned to project a patterned light onto the smooth resin layer to cure at least a portion of the resin in the smooth resin layer to form a layer of the article;
- a heating apparatus enclosing at least the vat, the build platform, and the resin applicator to heat the resin, when the resin is in the vat, to an elevated temperature with respect to room temperature during the additive manufacturing; and
- an optical window through which the patterned light is projected onto the smooth resin layer, wherein the light source is external to the heating apparatus.

2. The top-down stereolithography apparatus according to claim 1, wherein the light source comprises an ultraviolet light source.

3. The top-down stereolithography apparatus according to claim 1, wherein the light source comprises a pattern-forming element operatively associated with a controller.

4. The top-down stereolithography apparatus according to claim 1, wherein the light source comprises a digital micromirror device (DMD), a spatial light modulator (SLM), a microelectromechanical system (MEMS) mirror array, a mask, a reticle, or a combination thereof.

5. The top-down stereolithography apparatus according to claim 1, wherein the patterned light is projected onto the smooth resin layer from above during the additive manufacturing.

6. The top-down stereolithography apparatus according to claim 1, wherein the elevated temperature is about 80° C. to about 250° C.

7. The top-down stereolithography apparatus according to claim 1, wherein the layer thickness is about 10 μm to about 100 μm.

8. The top-down stereolithography apparatus according to claim 1, wherein the resin applicator is configured to recoat a resin having a viscosity up to about 100 Pa·s at the elevated temperature.

9. The top-down stereolithography apparatus according to claim 1, wherein the resin applicator comprises a revolving recoat blade rotatable about a central axis.

10. A method of manufacturing an article from a high-viscosity resin in a layer-by-layer approach, the method comprising:

- providing a top-down stereolithography apparatus comprising:
  - a vat for containing the high-viscosity resin, the vat having a first area comprising a lower surface, the vat further having at least one opening in the lower surface that opens to a second area of the vat that extends vertically below the lower surface;
  - a build platform within the second area, wherein the build platform is incrementally movable vertically by a plurality of increments with respect to the lower surface of the vat, and wherein each of the increments in the plurality of increments defines a layer thickness in the article;
  - a resin applicator within the vat, the resin applicator comprising at least one recoat blade that holds a portion of the resin within a portion of the first area of the vat comprising the lower surface so that the portion of the resin is positioned above the lower surface of the first area and away from the at least one opening, the at least one recoat blade of the resin applicator movable within the vat to scrape the portion of the resin across the at least one opening that opens to the second area in the vat and away from the at least one opening;

a light source positioned to project a patterned light onto the smooth resin layer to cure at least a portion of the resin in the smooth resin layer to form a layer of the article;

a heating apparatus enclosing at least the vat, the build platform, and the resin applicator to heat the resin, when the resin is in the vat, to an elevated temperature with respect to room temperature during the additive manufacturing; and an optical window through which the patterned light is projected onto the smooth resin layer, wherein the light source is external to the heating apparatus;

uniformly heating the high-viscosity resin to the elevated temperature with respect to room temperature to form a heated resin, wherein the heated resin is in the vat;

forming a first layer of the article by (i) positioning the build platform within the at least one opening at a distance below the lower surface of the vat, the distance defining a layer thickness, (ii) scraping the portion of the heated resin across the at least one opening to form a smooth resin layer within the at least one opening, wherein an upper surface of the smooth resin layer is level with the lower surface of the first area of the vat that holds the portion of the resin, the smooth resin layer having a thickness equal to the layer thickness, (iii) projecting the patterned light onto the smooth resin layer to cure at least a portion of the smooth resin layer to form the first layer of the article;

forming a subsequent layer of the article by (i) incrementally lowering the build platform in the opening the distance equal to the layer thickness, (ii) scraping the portion of the heated resin across the at least one opening to form another smooth resin layer within the at least one opening having a thickness equal to the layer thickness, (iii) projecting the patterned light source onto the smooth resin layer to cure at least a portion of the smooth resin layer to form the subsequent layer of the article on top of a previous layer of the article;

repeating the formation of a subsequent layer a number of times to form the article layer-by-layer.

11. The method according to claim 10, wherein the elevated temperature is about 100° C. to about 250° C.

12. The method according to claim 10, wherein the layer thickness is about 10 μm to about 100 μm.

13. The method according to claim 10, wherein the resin is a solid at room temperature.

14. The method according to or claim 10, wherein the heated resin has a viscosity of about 5 Pa·s or less at the elevated temperature.

15. The method according to claim 10, wherein the heated resin has a viscosity of about 5 Pa·s to about 50 Pa·s at the elevated temperature.

16. The method according to claim 10, wherein the resin comprises a polymer selected from the group consisting of a polyetherimide, a polyphenylene sulfide, a polyarylether ketone, a polyamide, a polyamide-imide, a thermoplastic polyimide, a copolymer thereof, and a blend thereof.

17. The method according to claim 10, wherein the resin comprises a thermoplastic, a thermoset, a pseudo-thermoplastic, or a combination thereof.

18. The method according to claim 10, wherein the resin is a solid at room temperature, and the method further comprises melting the solid resin and dissolving a photoinitiator in the melted resin.

19. The method according to claim 10, wherein the resin is solvent-free.

20. The method according to claim 10, wherein the article comprises features having dimensions of about 0.01 mm to about 1 mm.

* * * * *